Nov. 22, 1927.

W. S. SHERMAN

SAW

Filed June 25, 1923

1,649,864

INVENTOR
WILLIS S. SHERMAN
By Paul, Paul & Moore
ATTORNEYS

Patented Nov. 22, 1927.

1,649,864

UNITED STATES PATENT OFFICE.

WILLIS S. SHERMAN, OF MINNEAPOLIS, MINNESOTA.

SAW.

Application filed June 25, 1923. Serial No. 647,717.

This invention relates to improvements in saws particularly adapted for use in sawing or cutting lumber, etc., and more particularly relates to improvements in saw teeth. The particular object of this invention is to provide a saw having improved teeth which are so shaped and ground that they will produce a smooth clean cut in practically all kinds of wood.

A further object is to provide a saw having teeth which may be easily and quickly ground to present a true and keen cutting edge.

A further object is to provide a saw which will cut square and will also cut in a straight line without any tendency to lead to one side.

Other objects of the invention will more fully appear from the following description and the accompanying drawings, and will be pointed out in the annexed claims.

In the drawings there is illustrated a structure designed to carry out the objects of the invention, but it is to be understood that the invention is not confined to the exact features shown, as various changes may be made within the scope of the claims which follow.

Figure 6:
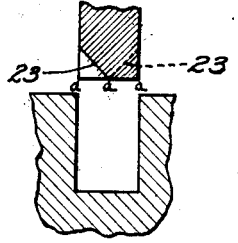
Figure 6 is a sectional view showing the saw disengaged from the board, leaving a smooth clean cut.
Figure 8:
Figure 7:
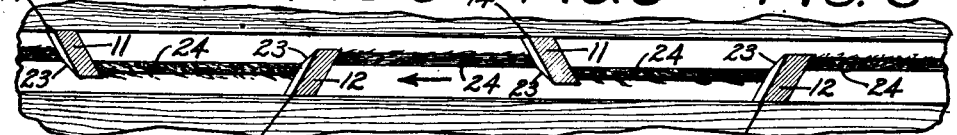
Figure 7 is a plan view on the line 7—7 of Figure 1, showing how the teeth are preferably arranged in staggered relation, each tooth cutting approximately one-half of the width of the cut.
Figure 9:
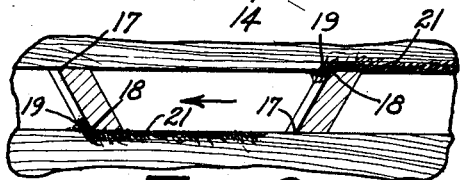

Figure 8 is a view similar to Figure 6, showing a saw having a common form of tooth and also showing the ragged or rough sides of the cut or kerf as a result of the negative or lagging cutting edge of each tooth; and Figure 9 is a view similar to Figure 7, showing a common form of tooth adapted to cut the full width of the kerf and also showing the rough or ragged edges of the cut caused by the negative cutting edge of each tooth.

Figure 1:
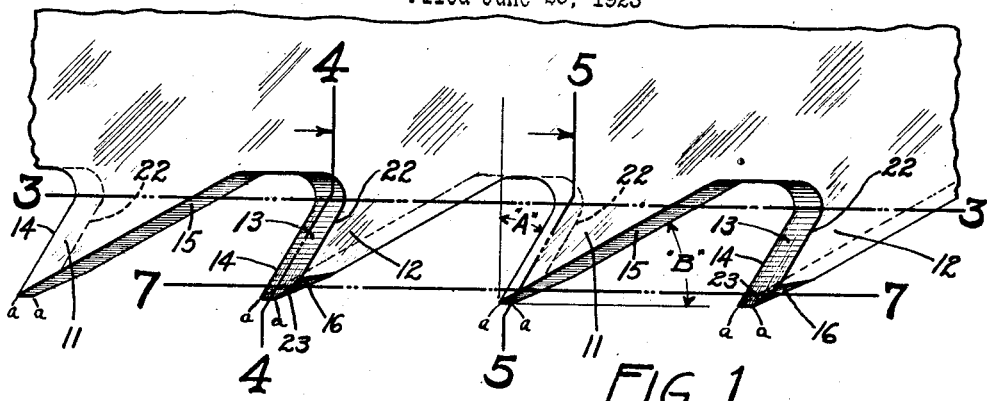
Figure 1 is a view in side elevation of a portion of a saw, showing my invention applied thereto.
Figure 2:
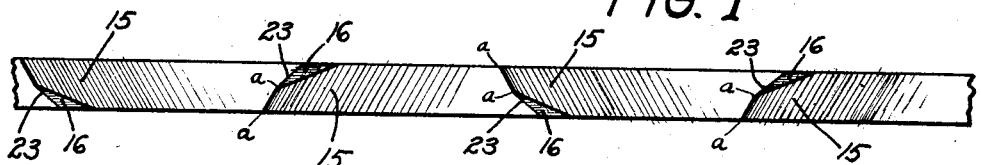
Figure 2 is a bottom view of Figure 1, showing how one corner of the point of each tooth is ground off to prevent each tooth from cutting the full width of the cut or kerf.
Figure 3:
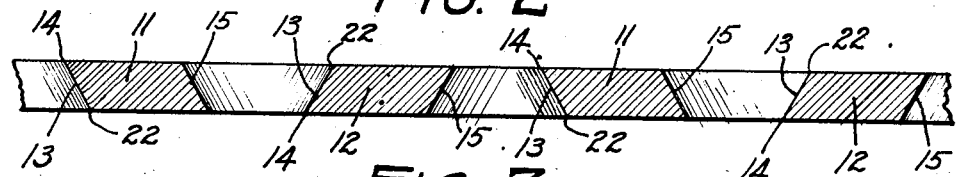
Figure 3 is a longitudinal sectional view on the line 3—3 of Figure 1, showing how the teeth are ground.

In the selected embodiment of the invention here shown, there is illustrated a portion of a saw having a plurality of teeth 11 and 12 arranged in staggered relation, as shown in Figures 1 and 2. The teeth as here shown, are of the well-known hook type, each tooth being so shaped that when its front face 13 is filed or ground obliquely to the sides of the saw, an inclined cutting edge 14 will be formed the full length of the tooth. The purpose of shaping the front side of each tooth as above described is to provide a cutting edge, which, when in operation will cut with a drawing or shearing effect, resulting in a smooth clean cut being provided on each side of the kerf or groove produced by the saw.

The important feature of this invention resides in the formation of the terminal cutting edge $a$—$a$ provided at the point of each tooth. This cutting edge, as shown in the drawings, is preferably of such width as to cut substantially one-half of the width of the kerf or groove, i. e., every other tooth cutting one-half of the bottom of the groove and the remaining teeth cutting the other half thereof. The cutting edge $a$—$a$ is also shaped so that it will be square with the sides of the saw or at right angles thereto, assuming that the saw blade is of uniform thickness, and in the case of a circular saw will be practically in the surface of a cylinder equal to the diameter of the saw.

This terminal cutting edge $a$—$a$ on each tooth, is preferably formed by first grinding one side of each tooth and then the other side thereof without changing the angular position of the grinding wheel relative to the sides of the saw, means being provided, however, for changing the feed angle of the grinder to correspond to the cutting angle "A" at the front of each tooth when grinding the face 13, and when grinding the back face 15 to change it to correspond to the clearance angle "B", as shown in Figure 1. By thus grinding or filing the teeth of the saw, the terminal cutting edges $a$—$a$ at the points of the teeth will be shaped and squared as hereinbefore described.

After the teeth have been thus formed the lagging corner or point of each tooth is filed or ground off back towards the front face 13 of the next tooth following, leaving the facets 16, as clearly shown in Figure 2, and thereby reducing the length of the terminal cutting edge $a$—$a$ to approximately one-half of the width of the kerf or groove cut by the saw. The purpose of thus reducing the length of the cutting edge $a$—$a$ is to eliminate the usual roughness or raggedness caused by the so-called negative lead of saws of ordinary construction in which the terminal cutting edge of each tooth is adapted to cut the full width of the saw-cut or kerf, as shown in Figures 8 and 9. In Figure 9, there is shown a saw tooth of ordinary construction having an inclined cutting edge 17 similar to the cutting edge 14, shown in Figure 1. It will be noted however, that the terminal cutting edge at the point of each one of these teeth extends from the cutting edge 17 of each tooth to the negative or lagging edge 18 of the same tooth, thus adapting it to cut the full width of the bottom of the groove. Obviously, the negative or lagging edge 18 of each tooth will not present as keen a cutting edge as the leading edge 17, due to the angle of the front face of the tooth. This edge 18, therefore, does not make as smooth and clean a cut as the leading edge 17, and also the small particles or chips of wood removed by the tooth in passing through the wood, have a tendency to crowd or wedge in between the side of the tooth and the wall of the groove or kerf, as shown at 19, in Figure 9, thereby causing the wood fibers to be torn or pulled apart instead of being severed with a smooth clean cut, as by the leading edge 17 at the other side of the tooth. A saw-cut or groove made by such a saw will therefore be more or less rough and ragged, as shown at 21, in Figures 8 and 9. This roughness is especially noticeable when cutting in soft wood and has been found very objectionable when a smooth cut is desired, without any other finishing.

By the employment of the novel saw tooth featured in this invention a saw may be constructed which will cut a smooth clean groove or kerf in practically all kinds of wood, as indicated in Figure 6, the bottom thereof also being square with the sides of the groove. This important feature of the invention, as hereinbefore stated, is accomplished by the novel shape of the terminal cutting edge $a$—$a$ at the point of each tooth.

Figure 4:
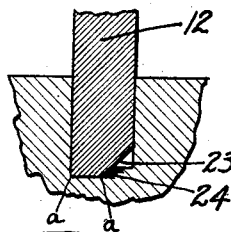
Figure 4 is a cross sectional view on the line 4—4 of Figure 1, showing the saw positioned in a groove and also showing the depth of the feed and the width of cut for each tooth.
Figure 5:
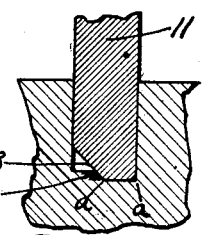
Figure 5 is a similar view taken on the line 5—5 of Figure 1, showing how the other side of the cut or kerf is cut away by the next following tooth.

Referring to Figures 1 and 2, it will be noted that these teeth also have what is known as a negative or lagging edge 22 which is similar to the edge 18 of the teeth, shown in Figures 8 and 9. It will be noted, however, that the teeth shown in Figures 1 to 7 inclusive, differ from those shown in Figures 8 and 9, in that the lower portion of the lagging edge 22 has been ground off by the formation of the facet 16 at the lower portion of each tooth. In forming these faces or facets 16, the lower corner of each tooth is preferably ground or filed off at an angle of approximately forty-five degrees with reference to the cutting edge $a$—$a$ of the tooth, as shown in Figures 4 and 5, or sufficiently to prevent the lower portion of the lagging edge 22 at the side of the tooth, from engaging the bottom of the groove, as shown. By thus grinding off the lower corner of each tooth the usual negative cutting edge at the lower lagging corner of each tooth, as shown in Figure 9, will be removed therefrom, and an angular negative cutting edge 23 will be provided extending from the center of each tooth and outwardly therefrom, as shown in Figures 1, 2, 4, 5 and 6.

By thus moving the negative cutting edge of each tooth from the side thereof towards the center of the tooth, as shown in the drawings, the rough and ragged edge 24 produced thereby will be in the central portion of the cut or kerf. In Figure 4 a saw tooth is shown positioned in a groove and the depth of the feed is also indicated. In this same figure it will be noted that the ragged edge 24, produced by the negative cutting edge 23, will be in the path of the next following tooth and will therefore be removed thereby. Each tooth will thus leave a rough or ragged edge 24 which in turn will be removed by the next following tooth thereby producing a cut or groove which will be smooth and clean cut on both sides and bottom, as shown in Figure 6. To provide clearance for the upper portion or body of the saw, the teeth may be slightly set or the body hollow ground, as desired, which is a common practice and is well known to those familiar with the art of saw manufacturing.

From the foregoing it will be noted that the novel saw teeth featured in this invention differ from those in use at the present time in that the effective negative cutting edge of each tooth has been moved from the side of the tooth towards the center thereof, thus eliminating the ragged edge from the side of the cut or kerf, and placing it where it will be removed by the next following tooth, thus leaving both sides of the kerf smooth and clean cut. Also the terminal cutting edge $a$—$a$ at the point of each tooth is at right angles or square to the sides of the saw and is at an angle with reference to the longitudinal center line of the saw blade, or in the case of a circular saw, with reference to the axis thereof. Both the front and back planes or faces 13 and 15, respectively of each tooth are also ground preferably parallel, thereby providing a tooth which may be easily and quickly ground or filed, either by hand or by automatic machinery. This novel tooth is also adaptable to practically all types of wood working saws such as reciprocating, circular and band saws. It will cut considerably faster than saws having teeth of ordinary construction and will also cut square and in a straight line, the novel shape of the teeth being such as to positively eliminate any tendency of the blade to lead to one side.

I claim as my invention:

1. A saw having alternately ground teeth, the front face of each tooth being ground at substantially the same oblique angle to the plane of the saw blade as the back face of the same tooth and intersecting with the back face to provide inclined side and terminal cutting edges which are also at oblique angles to the sides of the saw, but substantially at right angles to each other.

2. A saw having alternately ground teeth, the front face of each tooth being ground at substantially the same oblique angle to the plane of the saw blade as the back face of the same tooth and intersecting with the back face to provide inclined side and terminal cutting edges which are also at oblique angles to the sides of the saw, but substantially at right angles to each other, and the inclined side cutting edge extending the full length of each tooth.

3. A saw having alternately ground teeth, the front and back faces of each tooth being ground at substantially the same oblique angle to the plane of the saw blade, but at different angles to the horizontal plane of the blade, whereby the front and back faces of each tooth will intersect to provide inclined side and terminal cutting edges, disposed substantially at right angles to each other, and the lagging portion of each terminal cutting edge being ground off to reduce the effective cutting width of the tooth to substantially one-half the width or thickness of the blade, whereby a smoother and cleaner cut will be obtained.

In witness whereof, I have hereunto set my hand this 20th day of June, 1923.

WILLIS S. SHERMAN.